(12) United States Patent
Lee et al.

(10) Patent No.: US 8,999,554 B2
(45) Date of Patent: Apr. 7, 2015

(54) LITHIUM SECONDARY BATTERY AND PREPARATION THEREOF

(71) Applicant: LG Chem, Ltd., Seoul (KR)

(72) Inventors: Chul-Haeng Lee, Daejeon (KR); Doo Kyung Yang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/958,956

(22) Filed: Aug. 5, 2013

(65) Prior Publication Data

US 2013/0316221 A1 Nov. 28, 2013

Related U.S. Application Data

(63) Continuation of application No. PCT/KR2012/011622, filed on Dec. 27, 2012.

(30) Foreign Application Priority Data

Dec. 27, 2011 (KR) .................. 10-2011-0143839
Dec. 27, 2012 (KR) .................. 10-2012-0154703

(51) Int. Cl.

| H01M 2/16 | (2006.01) |
|---|---|
| H01M 10/058 | (2010.01) |
| H01M 2/14 | (2006.01) |
| H01M 2/36 | (2006.01) |
| H01M 10/0566 | (2010.01) |
| H01M 10/052 | (2010.01) |
| H01M 2/34 | (2006.01) |

(52) U.S. Cl.
CPC .......... *H01M 2/1673* (2013.01); *H01M 10/058* (2013.01); *H01M 2/145* (2013.01); *H01M 2/1646* (2013.01); *H01M 2/1686* (2013.01); *H01M 2/36* (2013.01); *H01M 10/0566* (2013.01); *H01M 2/1606* (2013.01); *H01M 10/052* (2013.01); *Y02T 10/7011* (2013.01); *H01M 2/348* (2013.01); *H01M 2/162* (2013.01)

(58) Field of Classification Search
None
See application file for complete search history.

(56) References Cited

U.S. PATENT DOCUMENTS

2009/0202891 A1* 8/2009 Morganstein .................. 429/80
2011/0064988 A1* 3/2011 Yu .................. 429/144

FOREIGN PATENT DOCUMENTS

| JP | 2001185219 A | 7/2001 |
|---|---|---|
| JP | 2003272707 A | 9/2003 |
| KR | 20020025302 A | 4/2002 |
| KR | 20100120952 A | 11/2010 |
| KR | 20110016416 A | 2/2011 |

OTHER PUBLICATIONS

International Search Report for Application No. PCT/KR2012/011622 dated Apr. 19, 2013.

* cited by examiner

*Primary Examiner* — Patrick Ryan
*Assistant Examiner* — Haixia Zhang
(74) *Attorney, Agent, or Firm* — Lerner, David, Littenberg, Krumholz & Mentlik, LLP

(57) ABSTRACT

The present invention provides a lithium secondary battery and the preparation thereof, more specifically a lithium secondary battery comprising an electrode assembly having a cathode, an anode, and a separator interposed between the cathode and the anode; and a non-aqueous electrolyte solution impregnated in the electrode assembly, wherein the separator further comprises a layer having a plurality of destroyed capsules dispersed therein, the layer being formed on at least one surface of the separator coming into contact with the cathode and the anode, and the destroyed capsules has a film formed from a binder polymer and inorganic particles dispersed therebetween. The lithium secondary battery of the present invention can be prepared without the separate introducing process of a non-aqueous electrolyte solution, and has a separator exhibiting improved mechanical property and safety.

8 Claims, 3 Drawing Sheets

LITHIUM SECONDARY BATTERY AND PREPARATION THEREOF

CROSS-REFERENCE TO RELATED APPLICATION

The present application is a continuation of International Application No. PCT/KR2012/011622 filed on Dec. 27, 2012, which claims priority to Korean Patent Application No. 10-2011-0143839 filed in the Republic of Korea on Dec. 27, 2011, and Korean Patent Application No. 10-2012-0154703 filed on Dec. 27, 2012, the disclosures thereof are incorporated herein by reference.

TECHNICAL FIELD

The present invention relates to a lithium secondary battery and a method for the preparation thereof, more specifically to a lithium secondary battery which comprises a separator having enhanced mechanical property and can be simply prepared without the introducing process of a non-aqueous electrolyte solution, and a method for the preparation thereof.

BACKGROUND ART

Recently, there has been growing interest in energy storage technologies. As energy storage technologies are extended to devices such as cellular phones, camcorders and notebook PC, and further to electric vehicles, demand for high energy density of batteries used as a source of power supply of such devices is increasing. Therefore, research and development of lithium secondary batteries, which most meet the demand, are actively being conducted.

Among secondary batteries currently used, a lithium secondary battery developed in the early 1990's comprises an anode made of carbon material capable of intercalating or disintercalating lithium ions, a cathode made of lithium-containing oxide, and a non-aqueous electrolyte solution obtained by dissolving a suitable amount of lithium salt in a mixed organic solvent, and is prepared by storing such components in a case.

Such a lithium secondary battery is conventionally prepared by inserting an electrode assembly having electrodes on both sides of a separator in a battery case, and introducing a non-aqueous electrolyte solution into the battery case.

However, in order to introduce the non-aqueous electrolyte solution in the battery case, the battery case needs to be cut before introduction and then be closed after introduction, which brings about a great amount of inconvenience and may also damage the materials of the battery case. Until now, there has been no efficient solution for such a problem.

Meanwhile, overheating of lithium secondary batteries may cause thermal runaway or a puncture of a separator may pose an increased risk of explosion. In particular, porous polyolefin substrates commonly used as separators of lithium secondary batteries undergo severe thermal shrinkage at a temperature of 100° C. or higher in view of their material characteristics and production processes including elongation. This thermal shrinkage behavior may cause a short circuit between a cathode and an anode.

Accordingly, various researches have been made in order to prevent such a short circuit between a cathode and an anode even though batteries malfunction.

DISCLOSURE

Technical Problem

The present invention is designed to solve the above-mentioned problems, and therefore it is an object of the present invention to provide a lithium secondary battery whose non aqueous electrolyte can be introduced in a simple way, which can prevent a short circuit between a cathode and an anode even though batteries malfunction, and a method for the preparation thereof.

Technical Solution

In order to accomplish the above object, in accordance with one aspect of the present invention, there is provided a lithium secondary battery, comprising an electrode assembly having a cathode, an anode, and a separator interposed between the cathode and the anode; and a non-aqueous electrolyte solution impregnated in the electrode assembly, wherein the separator further comprises a layer having a plurality of destroyed capsules dispersed therein, the layer being formed on at least one surface of the separator coming into contact with the cathode and the anode, and the destroyed capsules has a film formed from a binder polymer and inorganic particles dispersed therebetween.

In the lithium secondary battery of the present invention, the inorganic particles are preferably selected from the group consisting of inorganic particles having a dielectric constant of 5 or higher, inorganic particles having the ability to transport lithium ions, and a mixture thereof.

In the lithium secondary battery of the present invention, the binder polymer is preferably selected from the group consisting of polyethylene, polystyrene, polyvinylidene fluoride-co-hexafluoropropylene, polyvinylidene fluoride-co-trichloroethylene, polyethylene glycol diacrylate, polyethylene glycol phosphate diacrylate, polyacrylate, polymethyl methacrylate, polyisobutylmethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, polyteterahydrofuran, polymethacrylic acid lithium, polyacrylic acid lithium, polymaleic acid lithium, polyvinyl sulfonic acid lithium, polyvinyl phosphonic acid lithium, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof, but the present invention is not limited thereto.

In the lithium secondary battery of the present invention, the weight ratio of the inorganic particles and the binder polymer may be in the range of 1:1 to 10:1.

In the lithium secondary battery of the present invention, the capsule stores a non-aqueous electrolyte solution before being destroyed.

In accordance with another aspect of the present invention, there is provided a method for preparing a lithium secondary battery, comprising applying a plurality of capsules and a dispersion medium on at least one surface of a separator or on a surface of at least one of a cathode and an anode to come into contact with the separator, the capsules having a film formed from a binder polymer and inorganic particles dispersed therebetween and storing a non-aqueous electrolyte solution; forming an electrode assembly by interposing the separator between the cathode and the anode; inserting the electrode assembly in a battery case; and bringing the electrode assembly into thermocompression before, after or both the electrode assembly is inserted in the battery case, to destroy the capsules and impregnate the non-aqueous electrolyte solution into the electrode assembly.

In the method of the present invention, the capsules may be applied on all of the separator, the cathode and the anode.

Advantageous Effects

The lithium secondary battery of the present invention, which is prepared by using capsules storing a non-aqueous electrolyte solution so that during thermocompression of an electrode assembly, the non-aqueous electrolyte solution may be uniformly provided to the entire area of the electrode assembly without a separate process, which improves wetting property of the electrolyte solution to electrodes. In accordance with the present invention, a conventional process of introducing a non-aqueous electrolyte solution is not necessary, and thus, a preparation of batteries can be simplified.

Also, according to the present invention, the cathode of the battery may be applied with capsules storing an anti-oxidizing agent on the surface thereof, and the anode of the battery may be applied with capsules storing an anti-reductive agent on the surface thereof, thereby providing an electrochemically more stable electrolyte. In addition, when the capsules are applied on a separator, they are selectively applied on the interface of the separator and the cathode or on the interface of the separator and the anode, thereby minimizing the decomposition of the electrolyte during the operation of the battery.

Further, since the lithium secondary battery of the present invention is prepared by using capsules whose film is made of inorganic particles and a binder polymer, destroyed capsules can strengthen the mechanical property of the separator and can prevent a short circuit between a cathode and an anode even though batteries malfunction.

DESCRIPTION OF DRAWINGS

Other objects and aspects of the present invention will become apparent from the following descriptions of the embodiments with reference to the accompanying drawings in which.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
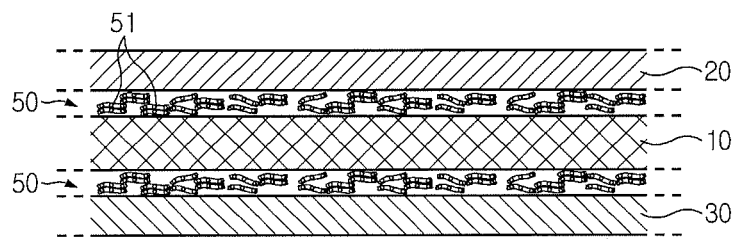
FIG. 1 is a schematic cross-sectional view of a unit electrode assembly comprised in a lithium secondary battery according to one embodiment of the present invention.

FIG. 1 schematically shows a unit electrode assembly according to one embodiment of the present invention. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Referring to FIG. 1, the present invention provides an electrode assembly having a cathode 20, an anode 30, and a separator 10. The separator 10 may comprise a layer 50 having a plurality of destroyed capsules 51 dispersed therein, the layer being formed on a part of the separator 10 coming into contact with the cathode 20, a part of the separator 10 coming into contact with the anode 30, or both. FIG. 1 illustrates a case in which the separator 10 comprises the layer 50 having a plurality of destroyed capsules 51 dispersed therein on both parts of the separator 10 coming into contact with the cathode 20 and the anode 30.

In the lithium secondary battery of the present invention, the capsules 51 store a non-aqueous electrolyte therein before their destruction and form a layer on at least one surface of the separator coming into contact with electrodes. The capsules 51 are destroyed when heat or pressure is applied to the electrode assembly during the preparation of the battery, while the stored non-aqueous electrolyte (not shown) is impregnated in the separator and at least one electrode of the cathode and the anode, by which the only film of the capsules remains on at least one surface of the separator coming into contact with at least one electrode of the cathode and the anode to form the layer 50.

In the present invention, the film of the capsules is formed from a binder polymer and inorganic particles. The binder polymer of the capsule film forms a bond with the separator after the capsules are destroyed by thermocompression, thereby enhancing the mechanical strength of the separator. The inorganic particles act as a spacer capable of maintaining the physical form of the destroyed capsule layer 50 to hinder the heat shrinkage of a porous substrate when an electrochemical device overheats or to prevent a short circuit between electrodes when thermal runaway occurs.

Also, interstitial volumes are present between the inorganic particles to form micropores. That is, in the destroyed capsule layer 50, the binder polymer allows the adhesion of the inorganic particles so that the inorganic particles can be bound with each other (i.e., the binder polymer connects and immobilizes the inorganic particles therebetween), and also, the destroyed capsule layer 50 maintains the bonding state with a porous substrate by the binder polymer. In the destroyed capsule layer 50, the inorganic particles are substantially present in contact with each other to form a closest packed structure, and an interstitial volume generated from the contact of the inorganic particles with each other becomes a pore of a porous coating layer.

In addition, since the destroyed capsules do not form one layer successively but a plurality of capsules are dispersed to form one layer, an interstitial volume present between the destroyed capsules 51 may become a pore of the destroyed capsule layer 50.

In the lithium secondary battery of the present invention, the inorganic particles which form the film of the capsules are not particularly limited if they are electrochemically stable. That is, the inorganic particles which may be used in the present invention are not particularly limited unless an oxidation-reduction reaction occurs in an operating voltage range (for example, 0 to 5 V based on $Li/Li^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher.

Non-limiting examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

Also, as the inorganic particles, inorganic particles having the ability to transport lithium ions, i.e., lithium-containing inorganic particles which can transfer lithium ions without holding them, may be used. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, and a mixture thereof.

Further, in the present invention, the binder polymer used in the capsules has preferably a glass transition temperature ($T_g$) of −200 to 200° C. so as to improve the mechanical properties such as flexibility and elasticity of the coating layer finally formed.

Also, the binder polymer is not necessarily required to have ionic conductivity, however, a polymer having ionic conductivity may be used to improve the performances of electrochemical devices. Accordingly, the binder polymer used in the present invention preferably includes one having a high dielectric constant. Actually, the dissociation rate of a salt in an electrolyte solution depends on a dielectric constant of the electrolyte solution. Therefore, the higher the dielectric constant of the binder polymer, the more the dissociation rate of a salt in an electrolyte solution increases. In this regard, in the present invention, the binder polymer may have a dielectric constant of 1.0 to 100 (measuring frequency=1 kHz), preferably 10 or higher.

Non-limiting examples of the binder polymer include polyethylene, polystyrene, polyvinylidene fluoride-co-hexafluoropropylene, polyvinylidene fluoride-co-trichloroethylene, polyethylene glycol diacrylate, polyethylene glycol phosphate diacrylate(copolymer of polyethyleneglycol diacrylate and bis[2-acryloyloxyethyl]phosphate), polyacrylate, polymethyl methacrylate, polyisobutylmethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, polyteterahydrofuran, polymethacrylic acid lithium, polyacrylic acid lithium, polymaleic acid lithium, polyvinyl sulfonic acid lithium, polyvinyl phosphonic acid lithium, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof.

The inorganic particles and the binder polymer are preferably used in a weight ratio of 1:1 to 10:1, more preferably 1.2:1 to 9:1. When the weight ratio of the inorganic particles and the binder polymer satisfies such a range, the dispersibility of the inorganic particles in the capsules storing the non-aqueous electrolyte solution can be maintained and the mechanical strength of the film of the capsules can be improved.

The non-aqueous electrolyte solution stored in the capsules may be any one which is conventionally used in the art.

The non-aqueous electrolyte solution used in the present invention comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution used in the present invention comprises an organic solvent which is conventionally used in an electrolyte solution for a lithium secondary battery, for example, propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxy ethane, diethoxy ethane, vinylene carbonate, sulfolane, γ-butyrolactone, propylene sulfite, teterahydrofuran, and a mixture thereof. In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

The capsules storing the non-aqueous electrolyte solution may be prepared by various methods known in the art, for example, solvent evaporation, coacervation, interfacial polycondensation, in-situ polymerization, micro-reaction process, piezoelectric process, spray drying, etc.

Specifically, the capsules may be prepared by dissolving a cellulose-based compound in a ketone- or ester-based solvent to obtain an organic solution; adding and dispersing an electrolyte solution in the organic solution to obtain a mixed solution; mixing the mixed solution with a solution of a water-soluble polymer such as polyvinyl alcohols, followed by rotating at a high speed to diffuse the organic solution and to form an emulsion; and forming microcapsules from the emulsion.

Alternatively, the capsules may be prepared by adding and uniformly dispersing an electrolyte solution to a solution of a polymer such as a cellulose-based compound, polyethylene, polystyrene and polyvinylidene fluoride-co-hexafluoropropylene; spraying the polymer solution containing the electrolyte solution dispersed therein by way of a conventional spraying; and maintaining the pressure and temperature of the reaction container properly to form capsules in the form of a microbead.

Furthermore, the capsules may be prepared in the form of microcapsules by using a material capable of forming bubbles by way of dispersing a micelle or colloid having hydrophilic or non-hydrophilic property. Also, the capsules may be prepared by applying an encapsulating process used in a drug delivery system.

The above-mentioned methods for preparing capsules are presented for the purpose of illustration, so the present invention is not limited thereto. Further, in the present invention, the capsules contain inorganic particles, to which the capsules are prepared by adding the inorganic particles to the polymer solution for the capsule film.

The capsules thus prepared may generally have a micro-size of several to tens of μm, but the size of the capsules may be varied depending on the amount of the stored electrolyte solution and the kinds of a material forming the capsule film. Also, the size and shape of the capsules may be varied depending on the desired specific use thereof and the preparation procedures thereof.

Hereinafter, a method for preparing a lithium secondary battery by using the above-mentioned capsules according to one embodiment of the present invention will be described. However, such a preparation method is just for illustration, so the present invention is not limited thereto.

First, the capsules containing a non-aqueous electrolyte solution according to the present invention are prepared and dispersed in a proper dispersion medium, followed by applying on at least one surface of a separator or on a surface of an electrode coming into contact with the separator. The application of the resulting solution may be carried out on both the separator and the electrode.

The separator may be obtained from a porous polymer substrate which is conventionally used as a separator in the art, for example, a porous polymer substrate made of polyolefin-based polymers, or a porous substrate made of any one electrode from the group consisting of polyethylene terephthalate, polybutylene terephthalate, polyester, polyacetal, polyamide, polycarbonate, polyimide, polyether ether ketone, polyether sulfone, polyphenylene oxide, polyphenylene sulfite, polyethyle naphthalene and a mixture. The porous polymer substrate made of polyolefin-based polymers may be any one which is conventionally used. More specifically, a membrane or non-woven fabric made of a polyolefin-based polymer selected from polyethylene such as high-density polyethylene, linear low-density polyethylene, low-density polyethylene and ultra-high molecular weight polyethylene, polypropylene, polybutylene, polypentene and a mixture thereof.

Also, in the present invention, the cathode and anode may be any one which is conventionally used in the preparation of a lithium secondary battery.

In the lithium secondary battery of the present invention, as the cathode active material, a lithium-containing transition metal oxide may be preferably used, for example, any one selected from the group consisting of $Li_xCoO_2(0.5<x<1.3)$, $Li_xNiO_2(0.5<x<1.3)$, $Li_xMnO_2(0.5<x<1.3)$, $Li_xMn_2O_4$ $(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2(0.5<x<1.3, 0≤y<1)$, $Li_xNi_{1-y}Mn_yO_2$ $(0.5<x<1.3, 0≤y<1)$, $Li_x(Ni_aCo_bMn_c)O_4(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4(0.5<x<1.3, 0<z<2)$, $Li_xCoPO_4$ $(0.5<x<1.3)$, $LixFePO_4(0.5<x<1.3)$ and a mixture thereof may be used. The lithium-containing transition metal oxide may be coated with a metal such as aluminum (Al) and a metal oxide. In addition, lithium-containing transition metal sulfide, selenide, or halide may also be used.

Among these, a mixture of $Li_xCoO_2(0.5<x<1.3)$ and $Li_x(Ni_aCo_bMn_c)O_2$ $(0.5<x<1.3, 0<a<1, 0<b<1, 0<c<1, a+b+c=1)$, or $Li_xCoO_2(0.5<x<1.3)$ coated with aluminum is preferably used as the cathode active material. Particularly, $Li_x(Ni_aCo_bMn_c)O_2$ $(0.5<x<1.3, 0<a<1, 0<b<1, 0<c<1, a+b+c=1)$ is preferred in terms of providing high output characteristics under the condition of a high voltage.

As the anode active material, a carbon-based material, metallic lithium, silicone or tin which can conventionally intercalate and disintercalate lithium ions may be used, and also a metal oxide such as $TiO_2$ and $SnO_2$ having a potential to lithium less than 2V may be used. Among these, the carbon-based material is preferably used, and the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, meso-carbon microbeads, mesophase pitches, and high-temperature sintered carbon such as petroleum or coal tar pitch derived cokes.

The cathode and anode may comprise a binder, and as the binder, various kinds of binder polymers including vinylidene fluoride-hexafluoropropylene copolymer (PVDF-co-HFP), polyvinylidene fluoride, polyacrylonitrile and polymethylmethacrylate may be used.

After the capsules are applied, the separator is interposed between the cathode and the anode to form an electrode assembly, and the electrode assembly is inserted in a battery case.

In this case, a step for destroying the capsules to impregnate the stored non-aqueous electrolyte solution into the electrode assembly is further carried out, and such a step for the destruction of capsules and the impregnation into the electrode assembly may be classified into three ways depending on that a thermocompression procedure for destroying the capsules is made before the insertion of the electrode assembly in a battery case, after the insertion of the electrode assembly, or both before and after the insertion of the electrode assembly.

The first way is to bring the electrode assembly into thermocompression before the electrode assembly is inserted in a battery case, to destroy the capsules and impregnate the stored non-aqueous electrolyte solution into the electrode assembly.

The destruction of the capsules containing the non-aqueous electrolyte may be carried out under the conventional thermocompression conditions of the electrode assembly in various ranges depending on the kinds of a specific material forming the capsule film.

After the capsules are destroyed, since the stored non-aqueous electrolyte solution is discharged and impregnated into the separator and the electrodes, a separate process for introducing the non-aqueous electrolyte solution is not necessary.

Thus, after thermocompression, the electrode assembly is inserted in a battery case to prepare a battery. In the present invention, the lithium secondary battery may be a cylindrical shape using a can, a prismatic shape, a pouch shape or a coin shape, but is not particularly limited to its shape.

The second way is to insert the electrode assembly in a battery case and then bring the battery case into thermocompression, to destroy the capsules and impregnate the stored non-aqueous electrolyte solution into the electrode assembly.

In this case, the thermocompression of the battery case may be carried out under the conditions of 80° C. and 10 kgf/cm², but such conditions may be suitably modified depending on the glass transition temperature and boiling point of the material to be used. This way also does not need a separate process for introducing the non-aqueous electrolyte solution since the stored non-aqueous electrolyte solution is discharged and impregnated into the separator and the electrodes, similar to the thermocompression of the electrode assembly.

Also, the third way is to carry out the thermocompression for destroying the capsules before and after the electrode assembly is inserted in a battery case. In this case, the electrode assembly is subject to thermocompression before being inserted in the battery case to destroy a part of the capsules provided in the electrode assembly, and after the thermocompressed electrode assembly is inserted in the battery case, the battery case is further subject to thermocompression to destroy the capsules which are left undestroyed, thereby impregnating the non-aqueous electrolyte solution which have been stored in the capsules into the electrode assembly.

If the electrode assembly is directly subject to thermocompression, a high impregnation degree of the electrolyte into the electrode assembly may be obtained in principle, but it is actually difficult to quantify the solvent component of the electrolyte solution which evaporates after thermocompression. Accordingly, in order to maintain the uniformity of the procedures, it is preferred to carry out the thermocompression after sealing the battery case in which the electrode assembly is inserted. Also, in the case that several electrode assemblies are stacked, it is preferred that the electrode assemblies are subject to pre-thermocompression before stacking, and then the stacked electrode assemblies are inserted in a battery case and are further subject to thermocompression.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

EXAMPLES

Example 1

<Preparation of Capsules Having an Electrolyte Solution and a Coating Solution Containing the Capsules>

A coating solution was prepared by using phase-separation and UV curing processes. First, ethylene carbonate and ethyl methyl carbonate were mixed in a volume ratio of 5:5, in which $LiPF_6$ was dissolved until 1 mol/L of $LiPF_6$ solution was obtained, and polyethylene glycol diacrylate (PEGDA) 700 (Mn: 700) as a binder polymer was added to the solution so that the weight ratio of PEGDA 700 and the solution was 1:1, to obtain a first solution (Phase 1) as an electrolyte solution.

Then, in order to enhance the mechanical strength of the film of capsules for storing the electrolyte solution obtained above, $Al_2O_3$ as inorganic particles was added to the electrolyte solution of Phase 1 so that the weight ratio of $Al_2O_3$ and the binder polymer is 1.2:1, followed by stirring and dispersing.

Figure 2:
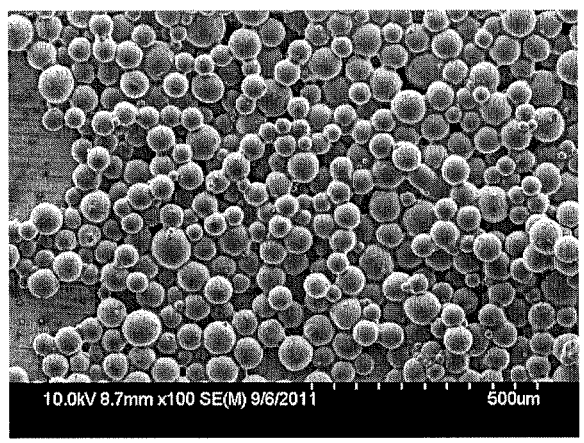
FIG. 2 is a SEM photograph of capsules obtained in one embodiment of the present invention.

Meanwhile, 5.9 parts by weight of sorbitan monooleate (Span 80) as a nonionic surfactant was added to 100 parts by weight of heptane, and 0.8 parts by weight of MBF (benzene acetic acid) as a photoinitiator was added thereto, to obtain a second solution (Phase 2) in which heptane was used as a main solvent. The first solution (Phase 1) and the second solution (Phase 2) were mixed in a ratio of 40:100, and the mixture was agitated at a speed of 1,000 rpm or higher for 30 minutes or longer, followed by UV radiation with 365 nm UVA light. After UV radiation, heptane was evaporated to obtain capsules. The obtained capsules were subject to SEM analysis, and the SEM image observed therefrom is shown in FIG. 2.

<Preparation of Battery>

In order to prepare an anode, 93 wt % of a carbon-based active material (MCMB 10-28, OSAKA GAS) and 7 wt % of polyvinyledene difluoride (PVDF) (Kynar 761, Elf Atochem) were dissolved in N-methyl-2-pyrrolidone (NMP) as a solvent and mixed in a mixer (Ika) for 2 hours, and the resulting solution was coated on a copper foil as a current collector, followed by drying at 130° C.

In order to prepare a cathode, 91 wt % of $LiCoO_2$, 3 wt % of PVDF (Kynar 761) and 6 wt % of a conductive carbon (KS-6, Lonza) were dissolved in N-methyl-2-pyrrolidone (NMP) as a solvent and mixed in a mixer (Ika) for 2 hours, and the resulting solution was coated on an aluminum foil as a current collector, followed by drying at 130° C. Meanwhile, as a bare film for separator, a polypropylene-based separator (Celgard™ 2400) was used.

The capsules obtained in the above, which contains an electrolyte solution, were coated in a certain amount on the surface of the anode by using a coater (blade). After coating, a drying process was carried out under vacuum at room temperature for 2 hours, thereby removing heptane. The dried anode, cathode and separator were inserted into an aluminum pouch to obtain a mono-cell. In a compressor whose temperature and pressure are controlled, a first pressing was carried out at 60° C. for 10 minutes until the distance between the top plate and the bottom plate becomes 30 μm, so as to induce the destruction of the capsules at room temperature, thereby leading to the good wetting of the non-aqueous electrolyte solution into the electrodes and the separator. Then, a second pressing was carried out with raising the temperature to 80° C. for 20 minutes. At this time, the final temperature and pressure were controlled to 80° C. and 10 $kgf/cm^2$, respectively. The mono-cell thus finally prepared was fully charged and evaluated for its performance.

Example 2

The procedure of Example 1 was repeated except that polyethylene glycol phosphate diacrylate obtained by mixing PEGDA 700 and bis[2-(acryloyloxy)ethyl]phosphate in a weight ratio of 1:1 was used as the binder polymer before UV radiation, to prepare non-aqueous electrolyte solution-containing capsules and a battery using the capsules.

Comparative Example 1

The procedure of Example 1 was repeated except that the inorganic particles of $Al_2O_3$ were not used, to prepare non-aqueous electrolyte solution-containing capsules and a battery using the capsules.

<Observation of Electrolyte in the Form of a Film>

Figure 3:
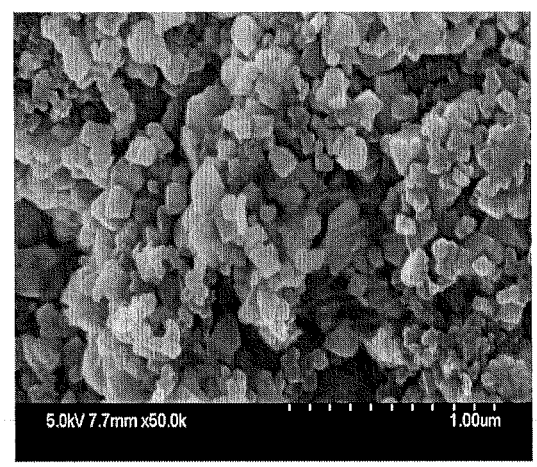
FIG. 3 is a SEM photograph showing the surface of an anode before a thermocompression process according to one embodiment of the present invention.
Figure 4:
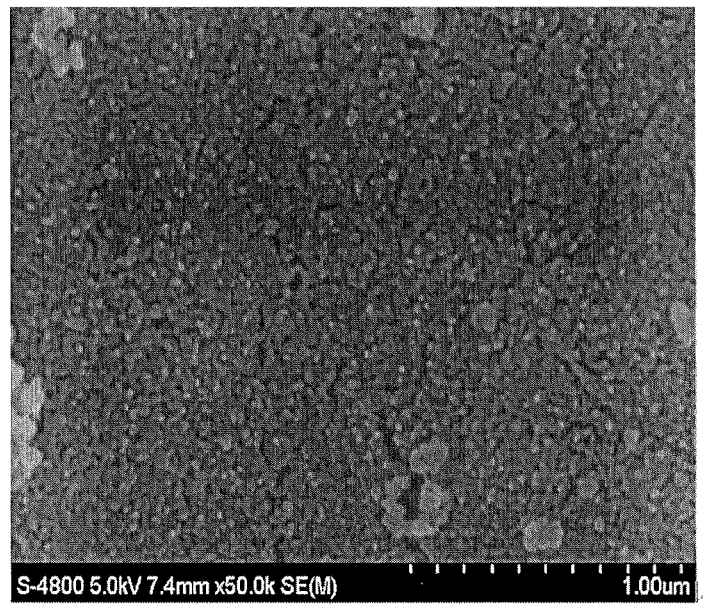
FIG. 4 is a SEM photograph showing the surface of an anode after a thermocompression process according to one embodiment of the present invention.

In order to confirm that an electrolyte solution having a spherical particle structure is well changed in the form of a film through thermo-compression between the cathode and the anode, the battery prepared in Example 1 was observed by SEM image analysis. After the battery in the form of a mono-cell was uniformly coated with an electrolyte solution having a spherical particle structure by using a coater on the surface thereof, the surface of the anode was observed before and after the thermo-compression under the conditions of 80° C. and 10 $kgf/cm^2$, and the results thereof are shown in FIGS. 3 and 4. FIG. 3 shows the SEM photograph of the anode surface before thermocompression, and FIG. 4 shows the SEM photograph of the anode surface after thermocompression. As can be confirmed from FIGS. 3 and 4, the electrolyte solution was formed in the form of a film on the anode surface after thermocompression.

<Evaluation of Effect of Inorganic Particles>

Figure 5:
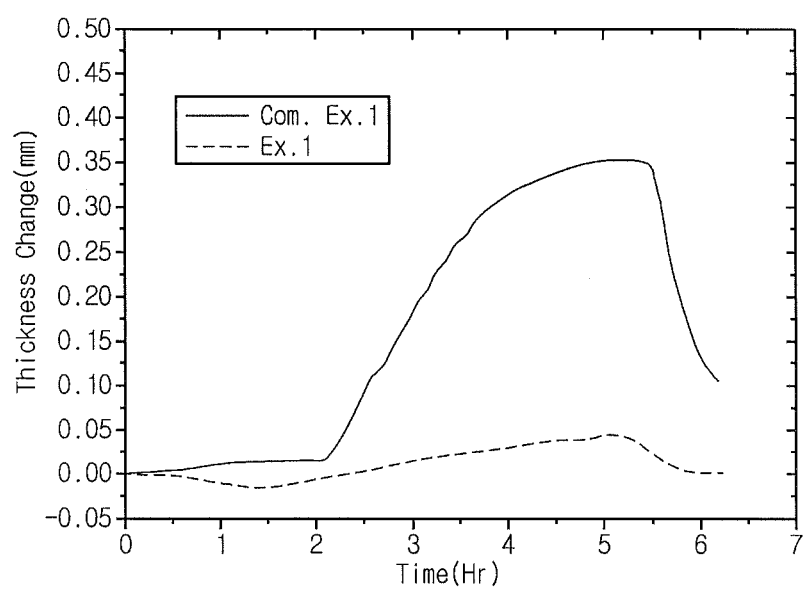
FIG. 5 is a graph showing a thickness change after fully charging batteries obtained in Example 1 and Comparative Example 1, followed by storing at 85° C. for 4 hours.

After the batteries of Example 1 and Comparative Example 1 were fully charged and stored at 85° C. for 4 hours, the thickness of the batteries was measured and the results thereof are shown in FIG. 5. As can be confirmed from FIG. 5, in Example where the capsules contain $Al_2O_3$ as inorganic particles, the electrolyte layer formed between the cathode and the anode has increased mechanical strength to provide an effect of preventing the thickness expansion in the batteries when the batteries were left at a high temperature.

Figure 6:
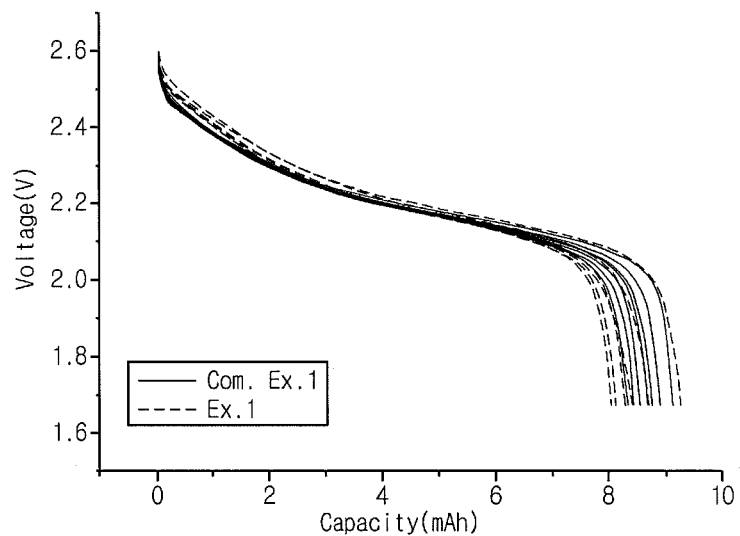
FIG. 6 is a graph showing discharging voltage profiles at 1 C for batteries obtained in Example 1 and Comparative Example 1.

Also, after the capsules having a non-aqueous electrolyte solution were destroyed through thermocompression, their discharging voltage profiles at 1 C were observed and the results thereof are shown in FIG. 6, from which batteries were confirmed to operate regardless of having or not having inorganic particles.

<Evaluation of Effect of Binder Polymer on Battery Performances>

In order to evaluate the effect of various binder polymers on battery performances, as in Example 2, polyethylene glycol phosphate diacrylate, a copolymer of polyethylene glycol diacrylate and bis[2-acryloyloxyethyl]phosphate having a phosphate ($PO_4$) functional group capable of lowering the resistance on a surface of anode was used as the binder polymer in the preparation of capsules, and the resulting capsules were uniformly coated on the surface of the anode, followed by thermocompression, to prepare a battery having a layer where destroyed capsules were dispersed.

Figure 7:
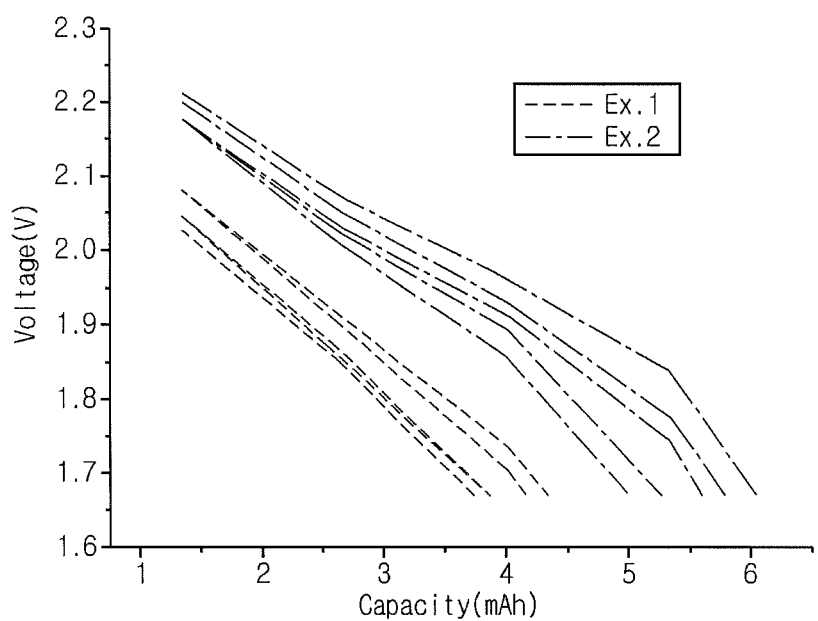
FIG. 7 is a graph showing the results of a high rate discharge test at 10 C for batteries obtained in Example 1 and Example 2.

The battery of Example 2 thus prepared and the battery of Example 1 using polyethylene glycol diacrylate as a binder polymer were subject to a high rate discharge test, and the results thereof are shown in FIG. 7. As can be confirmed From FIG. 7, in the battery of Example 2 using a binder polymer where a phosphate ($PO_4$) functional group is present, a high rate discharging characteristic has improved as compared with the battery of Example 1. Thus, in the preparation of capsules, a proper functional group which is suitable to the anode (reduction) and the cathode (oxidation) can be introduced to the binder polymer, thereby enhancing the performances of the battery.

What is claimed is:

1. A lithium secondary battery, comprising:
   an electrode assembly having a cathode, an anode, and a separator interposed between the cathode and the anode; and
   a non-aqueous electrolyte solution impregnated in the electrode assembly,
   wherein the separator comprises a porous substrate and a layer having a plurality of destroyed capsules therein, the layer being bonded to at least one surface of the porous substrate, and contacting the cathode or the anode,
   wherein each destroyed capsule has a film including a binder polymer and inorganic particles,
   wherein binder polymer from films of the destroyed capsules bonds the layer to the porous substrate, and
   wherein the layer further comprises pores and micropores, wherein the micropores comprise interstitial volumes present between inorganic particles, and wherein the pores comprise interstitial volumes present between destroyed capsules.

2. The lithium secondary battery according to claim 1, wherein the inorganic particles are selected from the group consisting of inorganic particles having a dielectric constant of 5 or higher, inorganic particles having the ability to transport lithium ions, and a mixture thereof.

3. The lithium secondary battery according to claim 2, wherein the inorganic particles having a dielectric constant of 5 or higher are selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

4. The lithium secondary battery according to claim 2, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), P2S5 type glass ($Li_xP_yS_z$, $0<x<3$, $0<y<3$, $0<z<7$) particles, and a mixture thereof.

5. The lithium secondary battery according to claim 1, wherein the binder polymer has a dielectric constant of 1.0 to 100 (when measured at a frequency of 1 kHz).

6. The lithium secondary battery according to claim 1, wherein the binder polymer is selected from the group consisting of polyethylene, polystyrene, polyvinylidene fluoride-co-hexafluoropropylene, polyvinylidene fluoride-co-trichloroethylene, polyethylene glycol diacrylate, polyethylene glycol phosphate diacrylate, polyacrylate, polymethyl methacrylate, polyisobutylmethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, polyteterahydrofuran, polymethacrylic acid lithium, polyacrylic acid lithium, polymaleic acid lithium, polyvinyl sulfonic acid lithium, polyvinyl phosphonic acid lithium, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof.

7. The lithium secondary battery according to claim 1, wherein the weight ratio of the inorganic particles to the binder polymer is in the range of 1:1 to 10:1.

8. The lithium secondary battery according to claim 1, wherein the capsules store the non-aqueous electrolyte solution before being destroyed.

* * * * *